United States Patent [19]

Palfalvy

[11] 4,019,462
[45] Apr. 26, 1977

[54] BIRD FEEDER, WATER AND BATH HANGING SUPPORT

[76] Inventor: Paul Palfalvy, 1105 Woodside Road, Redwood City, Calif. 94061

[22] Filed: Nov. 20, 1975

[21] Appl. No.: 633,621

[52] U.S. Cl. .............................. 119/51.5; 119/51 R
[51] Int. Cl.² ......................................... A01K 5/00
[58] Field of Search ................. 119/51.5, 51 R, 61, 119/23

[56] References Cited

UNITED STATES PATENTS

| | | | |
|---|---|---|---|
| 1,749,497 | 3/1930 | McGlashan | 119/61 |
| 2,591,459 | 4/1952 | Meany | 119/51 R |
| 2,715,386 | 8/1955 | Jones | 119/51.5 |
| 3,590,780 | 7/1971 | Dunbar | 119/51 R |

FOREIGN PATENTS OR APPLICATIONS

| | | | |
|---|---|---|---|
| 1,133,174 | 7/1962 | Germany | 119/61 |
| 915,480 | 1/1963 | United Kingdom | 119/51 R |

Primary Examiner—J.N. Eskovitz
Attorney, Agent, or Firm—Julian Caplan

[57] ABSTRACT

For transportation and storage the device is made of detachable components which are easily assembled without use of special tools. Three platforms, preferably circular, are held horizontal by at least one vertical post fitting through holes in the platforms. Fastening means engaging the post or posts hold the platforms horizontal and vertically spaced. Surrounding the two lower platforms and supported by dowels in the edges thereof are wires which function as perches. Edgings around the lower platforms prevent the contents from falling to the ground. On top of the upper platform is a pan and depending from its lower surface is a circular skirt which protects the contents of the lower platforms from being washed away by rain. The plan on the top functions as a bird bath. One of the lower platforms contains bird seed and the other gravel or other items on which birds feed. A hummingbird feeder may hang below the lowest platform.

3 Claims, 3 Drawing Figures

BIRD FEEDER, WATER AND BATH HANGING SUPPORT

This invention relates to a new bird feeder, water and bath hanging support. More particularly, the invention relates to a convenient station for feeding, bathing and watering birds. The station may be hung from a tree, the eaves of a house, a pole or other position where birds are safe from larger birds and other animals.

A feature of the invention is the fact that it is simple, made of inexpensive materials and inexpensive to manufacture.

Another feature of the invention is the fact that the various parts are detachable so that the device may be collapsed to compact form for transportation and storage.

Another feature of the invention is the fact that when erect and hanging it is attractive to the eye.

Still another feature of the invention is the fact that because it combines in a single station feed, gravel, water and a bath it attracts birds in large numbers.

Other objects of the present invention will become apparent upon reading the following specification and referring to the accompanying drawings in which similar characters of reference represent corresponding parts in each of the several views.

Figure 1:
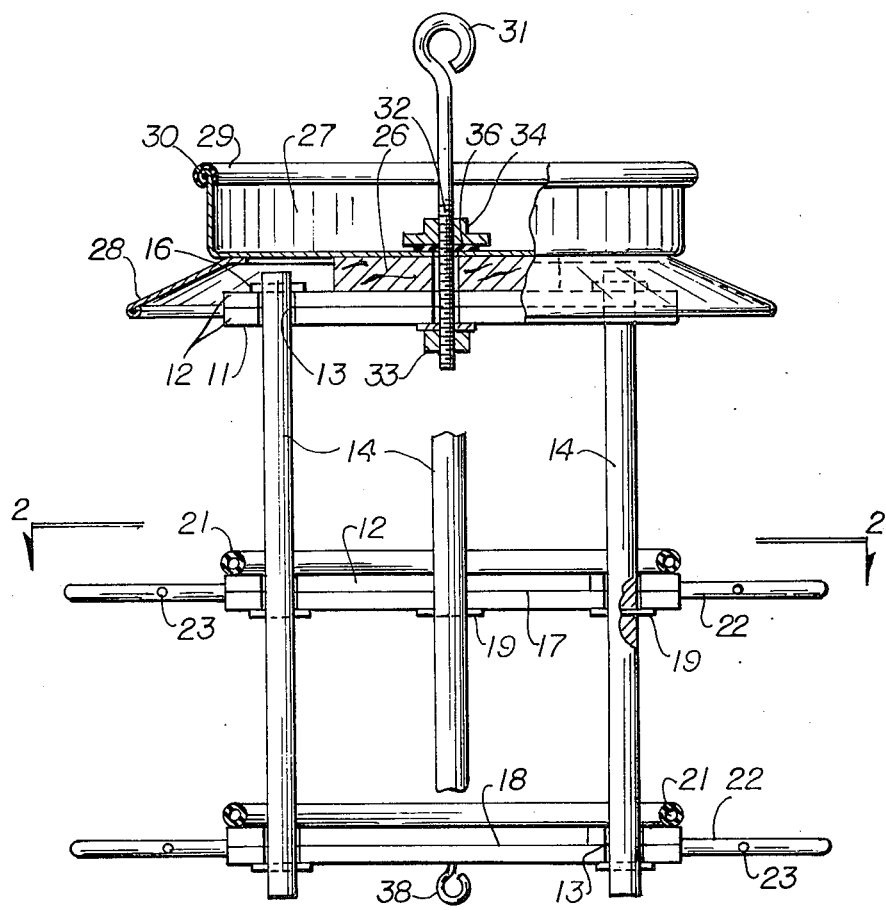
FIG. 1 is a side elevational view of the device partly borken away in section to reveal internal construction.
Figure 2:
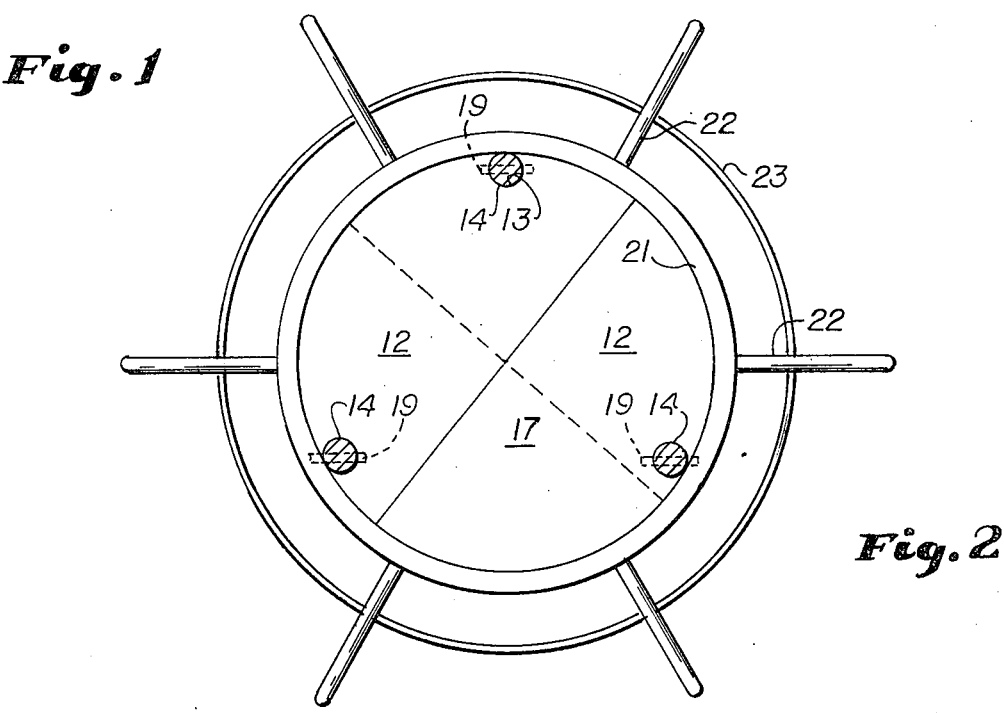
FIG. 2 is a sectional view taken substantially along the line 2—2 of FIG. 1.

As illustrated in FIGS. 1 and 2, there are three horizontal, preferably circular platforms which are suitably supported and vertically spaced. Top platform 11 for convenience in manufacture is preferably formed of four thin, semi-circular sections 12, overlapping and secured together by fasteners or adhesive (not shown). Spaced slightly inward from the periphery are holes 13 here shown as three in number, it being understood that the number of holes 13 and posts 14 which pass there-through is subject to variation. The posts 14 may be large dowels cut to suitable length. Pins 16 passing transversely through holes adjacent the upper ends of the posts 14 fit on top of the top platform 11. Middle platform 17 and bottom platform 18 are similar in shape and construction to platform 11 and are also formed with holes 13. Pins 19 passing transversely through holes in the posts 14 are located below platforms 17 and 18 and support the same against the force of gravity.

Preferably surrounding each of the platforms 17, 18 is an edging 21 which may be a section of rubber tubing immediately inside the periphery of the platform. The edging 21 prevents the material on the platforms 17 or 18 (which may be bird seed, gravel, or the like) from falling off the edge of the platform.

Extending radially from the edge of each platform 17, 18 is a plurality of radially extending arms 22 which may be dowels. A circle of insulated electric wire 23 passes through holes adjacent the inner ends of each of the arms 22. The wire 23 functions as a perch for the birds. The dowel portions beyond wire 23 also serve as perches.

Above the top platform 11 is a circular spacer. Above the spacer is a pan 27 for a bath, the upper edge of the pan 27 being formed with a bead 30. Welded or soldered to and projecting downwardly-outwardly around the bottom edge of pan 27 is a truncated conical skirt 28, the lower edge of which is also beaded. Skirt 28 protects the contents of platforms 17 and 18 from the elements and particularly from rain. Split tube edging 29 fits over head 30.

One suitable means to suspend the device is the use of a hook 31. The shank 32 of the hook 31 is threaded and passes through holes in the bottom of pan 27 and through spacer to platform 11. Threaded on to the lower end of shank 32 below platform 11 is a lower nut 33. Threaded on to the shank 32 above the bottom of pan 27 is upper nut 32 with a watertight gasket 36 beneath nut 34.

Below platform 18 a screw eye 38 may be provided to hang a commercially available hummingbird feeder, suet, an ornament or other device.

Figure 3:
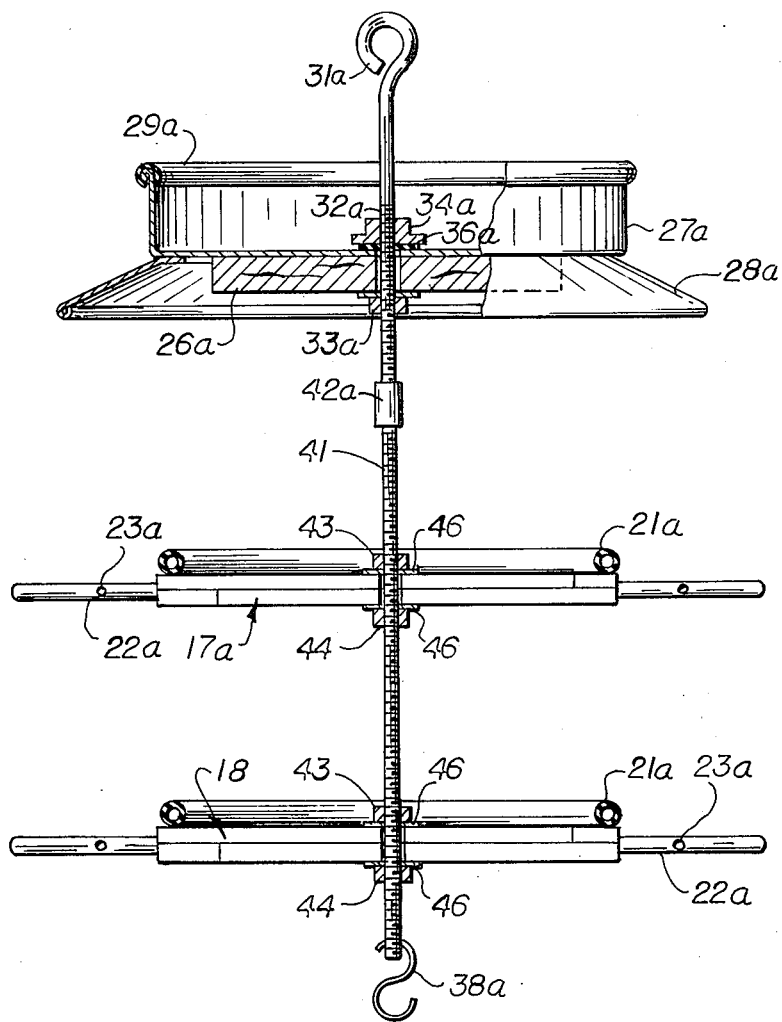
FIG. 3 is a view similar to FIG. 1 of a modification.

The modification of FIG. 3 is in many respects similar to that of FIGS. 1 and 2 and the same reference numerals, followed by subscript $a$ are used to designate corresponding parts. In the modification the platform immediately under pan 27a is omitted.

Instead of three posts 14 being used to suspend and space platforms 17a, 18a, a single rod 41 which is preferably threaded throughout its length is used. Rod 41 may be a continuation of the shank 32a but preferably it is a separate member and is joined to shank 32a by a commercially available threaded coupler 41. Above platform 17a a top nut 43 is threaded onto rod 41 and below the platform a bottom nut 44 is threaded. To give platform 17a stability, fairly large diameter washers 46 are interposed between the nuts 43, 44 and the platform. Hence by drawing the nuts rather tight, a single rod 41 will hold the platform steady. Plaform 18a is similarly supported.

Instead of a threaded rod 41, a tube (not shown) may be used and fastening means other than nuts 43, 44 substituted.

The bottom end of rod 41 may be transversely drilled and an S-hook 48a passed through the hole to hang a hummingbird feeder or the like.

What is claimed is:

1. A device for feeding and watering birds comprising a plurality of platforms each formed with a plurality of holes spaced adjacent the peripheries of said platforms, the holes in said platforms being aligned, a plurality of vertical posts passing through the holes in said platform, said posts being formed with holes perpendicular to the axes of said posts, pins passing through said holes, one said pin being located below one said platform for each said post, said pins attaching said posts to said platforms, said pins being capable of removal to disassemble said device, a bath pan supported above the uppermost of said platforms, a truncated conical skirt attached to the bottom of said pan to protect said platforms from the elements and from splashing from said pan, at least one said platform having a raised edging around the peripheries of said one platform, a plurality of radial arms extending out from the peripheral edge of one of said platforms, a perch supported near the inner ends of said arms, and support means for elevating said device above the ground.

2. A device according to claim 1 in which the inner end of each said arm is formed with a hole and said perch comprises a ring passing through said holes.

3. A device according to claim 1 which further comprises a hook on the bottom of the lowermost platform, said hook being suitable to suspend a hummingbird feeder.

* * * * *